United States Patent
Frank

(10) Patent No.: US 6,772,625 B2
(45) Date of Patent: Aug. 10, 2004

(54) METHOD FOR DETERMINING THE RESPONSE PRESSURE OF MOTOR VEHICLE BRAKES USING A TEST PRESSURE

(75) Inventor: Peter Frank, Budapest (HU)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/307,514

(22) Filed: Dec. 2, 2002

(65) Prior Publication Data

US 2003/0127910 A1 Jul. 10, 2003

Related U.S. Application Data

(63) Continuation of application No. PCT/EP01/05641, filed on May 17, 2001.

(30) Foreign Application Priority Data

May 30, 2000 (DE) .......................................... 100 26 688

(51) Int. Cl.⁷ .............................................. G01L 5/28
(52) U.S. Cl. ...................................................... 73/121
(58) Field of Search .......................... 73/121–132, 1.57, 73/1.79, 700, 714, 756

(56) References Cited

FOREIGN PATENT DOCUMENTS

| DE | 19521872 | 12/1996 |
|---|---|---|
| DE | 19602879 | 8/1997 |
| DE | 19648936 | 5/1998 |
| DE | 19517708 | 11/1998 |
| EP | 0733532 | 9/1996 |

Primary Examiner—William Oen
(74) Attorney, Agent, or Firm—Crowell & Moring LLP

(57) ABSTRACT

The invention relates to a method for determining the response pressure of motor vehicle brakes, according to which the brakes to be inspected are subjected to a test pressure, whereby before and after the creation of the test pressure, a test-pressure indicator signal is generated, which is a linear combination of an acceleration signal and a differential speed signal. If the two test-pressure indicator signals correspond, (considered to be a "non-response of the brakes"), the test-pressure is increased and a new test-pressure indicator signals do not correspond, the prevailing brake pressure is considered to be the response pressure.

16 Claims, 2 Drawing Sheets

METHOD FOR DETERMINING THE RESPONSE PRESSURE OF MOTOR VEHICLE BRAKES USING A TEST PRESSURE

This application is a continuation of PCT international application no. PCT/EP01/05641, filed May 17, 2001, and claims priority based on German patent application no. DE 100 26 688.6 filed May 30, 2000.

CROSS-REFERENCE TO RELATED APPLICATIONS

This application is a continuation of PCT international application no. PCT/EP01/05641, filed May 17, 2001, and claims priority based on German patent application no. DE 100 26 688.6 filed May 30, 2000, the specifications of which are incorporated by reference herein.

BACKGROUND AND SUMMARY OF THE INVENTION

The present invention relates to a method for determining the response pressure of vehicle brakes particularly a road vehicle, by a) admitting a test pressure to the brakes to be examined, with and without test pressure, b) measuring rotational wheel speed signals at at least two axles of the vehicle, c) from measured rotational wheel speed signals, determining an acceleration signal, and d) after the application of the test pressure, determining the brake pressure at the brake or brakes to be examined.

A device for determining the response pressure of the brakes of a vehicle is also provided.

A method of the above-mentioned type is known from European Patent Document EP 0 733 532 A2.

In the case of a vehicle brake system, a certain minimal brake pressure must be exceeded to generate a braking force. This minimal brake pressure is called the "response pressure". A vehicle braking system normally has several brakes, which may have different response pressures. This results in an undesirably high wear on the first-responding brakes. The wear problems are particularly significant when a towing vehicle is coupled with different trailers because the amount of the response pressure of individual vehicles depends on the individual restoring forces and the mechanical friction between individual brake components. The determination of the response pressure may take place, for example, on a roller-type test stand which, however, is relatively cumbersome.

From the above-mentioned European Patent Document EP 0 733 532 A2, a method is known in which the response pressure is determined during the drive, specifically by analyzing the vehicle acceleration. From rotational wheel speed signals, first a possibly existing vehicle deceleration is determined, which is called a "basic vehicle deceleration" and is caused, for example, by wind resistance, frictional forces or a slope inclination. Subsequently, the brake to be checked or the group of brakes to be checked are acted upon by a test pressure and the test vehicle deceleration which will then occur is determined. When the test vehicle deceleration does not change with respect to the basic vehicle deceleration, the test pressure is increased. If the vehicle deceleration increases and the difference between the test vehicle deceleration and the basic vehicle deceleration is greater than a defined tolerance value, the existing brake pressure is considered to be the response pressure of the brake. When analyzing rotational wheel speed signals, in practice, only relatively rough "deceleration stages" of approximately 0.2 m/s$^2$ can be detected. Consequently, in this state of the art, a certain "minimum test pressure" is required in order to reach a detectable deceleration change, which is perceived by the driver as a disturbing "jerking". Also, a vehicle deceleration as a result of a change of the engine power cannot be differentiated from a vehicle deceleration as a result of the testing brake pressure.

From German Patent Document DE 196 02 879 C1, a method is known for detecting the turnover risk of a vehicle, in the case of which the lateral vehicle acceleration is constantly monitored and, when a defined limit value is exceeded a test braking is carried out at a low braking force. It is then examined whether the ABS (antilocking system) is responding at individual wheels or wheel groups and is not responding at other wheels.

German Patent Document DE 196 48 936 A1 describes a method which determines the application pressures by means of a statistical analysis of measuring data—using a regression analysis. The measurements take place during service brakings, which therefore results in long identification times.

It is an object of the present invention to provide an improved method and an improved device for determining the response pressure of vehicle brakes.

This object is achieved by a method and device for determining the brake response pressure, including the steps of:

a) admitting a test pressure to the brakes to be examined, with and without test pressure, b) measuring rotational wheel speed signals at at least two axles of the vehicle;

c) from measured rotational wheel speed signals, determining an acceleration signal, d) after the application of the test pressure, determining the brake pressure at the brake or brakes to be examined;

e) in each case, for a driving condition with and without applying the test pressure, forming a differential speed signal (s) as a function of a difference between rotational wheel speed signals of a powered and of a non-powered axle;

f) forming test pressure indicator signals, respectively, each as a function of the acceleration signal and the differential speed signal; and g) comparing two test pressure indicator signals formed, and repeating steps (a)–(f) with an increased test pressure when the two test pressure indicator signals coincide, and emitting the applied test pressure when the two test pressure indicator signals do not coincide.

Advantageous developments and further developments are described herein.

The invention is based on the idea of admitting a test pressure to the brakes to be examined, in which case, before and after generating the test pressure, a test pressure indicating signal is generated. This signal is a linear combination of an acceleration signal and of a differential speed signal. If the two test pressure indicator signals correspond to one another within a tolerance band, which is considered to be a "non-response of the brake", the test pressure is increased and a new test pressure indicator signal is generated. If the two test pressure indicator signals do not correspond, the existing brake pressure is considered to be the response pressure if the difference between the two test pressure indictor signals exceeds a defined limit value.

While, in the state of the art, the response of the brake is recognized only by the analysis of the vehicle deceleration, the test pressure indicator signal used in the case of the invention, in addition to the acceleration signal, also includes a differential speed signal, which can also be called a "slip signal" and is formed of rotational wheel speed signals of an axle acted upon by the test pressure (or not acted upon by test pressure) or a wheel and a powered or non-powered vehicle axle.

Because the test pressure indicator signal according to the invention includes the acceleration signal and the differential speed signal, a response of the brake can already be recognized at lower test pressures. Another advantage of the use of the acceleration signal and of the differential speed signal or slip signal is the fact that a change of deceleration caused by the test pressure can be differentiated from a deceleration change, which is a result of a change in engine power, for example, as a result of applying gas or shifting-down into a lower gear. The change of the vehicle deceleration (jerking) caused by the test pressure is also reduced.

According to a further development of the invention, it is provided that, when the test pressure is generated, the vehicle deceleration is kept approximately constant by increasing the engine torque, which further increases the driving comfort. Furthermore, for example, a "combination" of a device according to the invention with a conventional cruise control may be provided so that the vehicle speed is kept constant. Also in this case, the test pressure indicator signal becomes sufficiently large since its slip component will grow because of the increased engine torque.

Other objects, advantages and novel features of the present invention will become apparent from the following detailed description of the invention when considered in conjunction with the accompanying drawings.

DETAILED DESCRIPTION OF THE DRAWINGS

Figure 1:
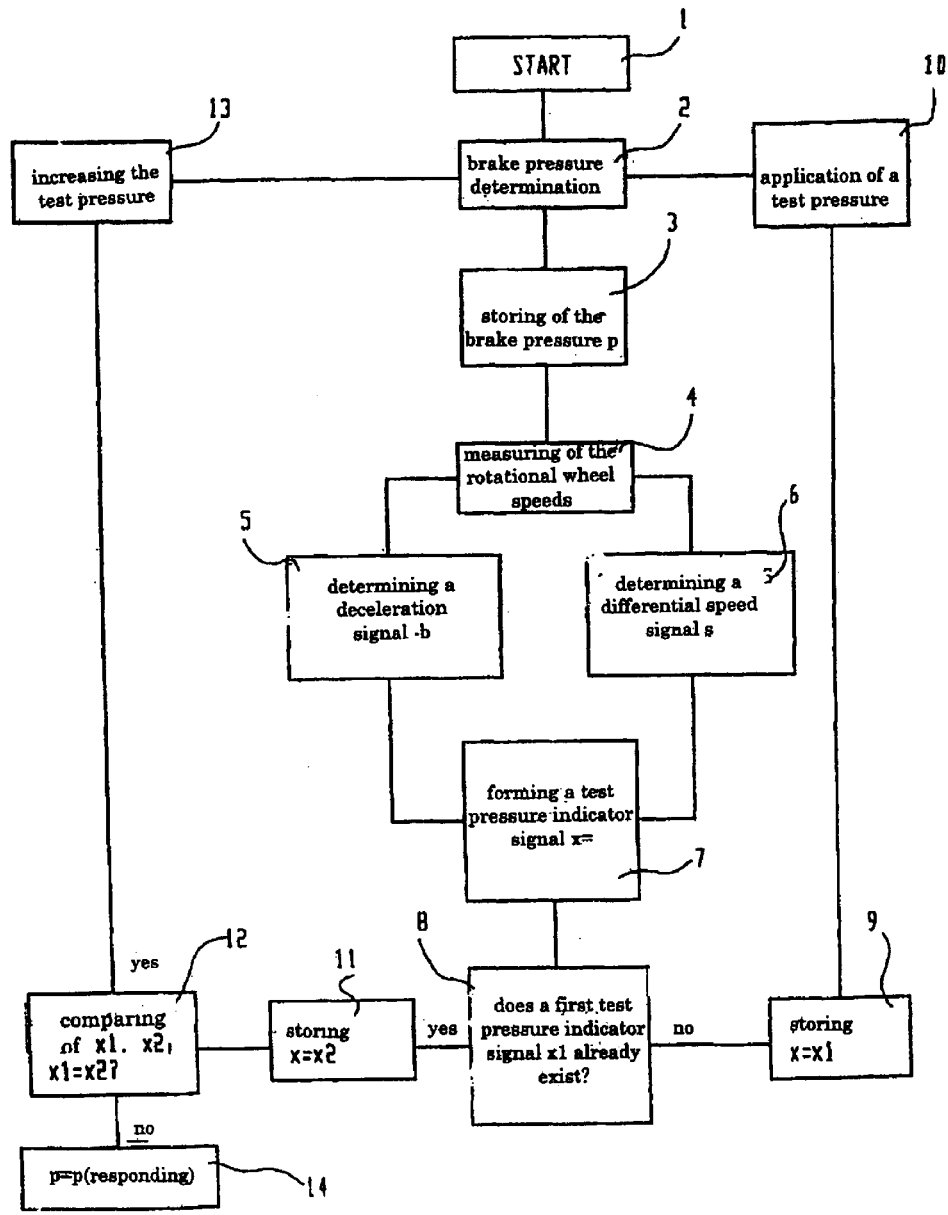
FIG. 1 is a schematic representation of the method according to the invention.

FIG. 1 is a flow chart of the method for determining a brake response pressure. Here, the brake response pressure is the response pressure of an individual wheel brake or the response pressure of a group of brakes; that is, the response pressure of brakes of one axle or one group of axles.

After an initialization Step 1, the brake pressure at the brake or brakes to be examined is determined in Step 2. The brake pressure p can be measured, for example, by pressure sensors or can be determined in a known manner mathematically by analyzing the opening and closing times of brake valves (ABS valves). The determined brake pressure p is stored in Step 3.

In Step 4, rotational wheel speeds of individual vehicle wheels are measured, for example, by means of rotational wheel speed sensors. From the rotational wheel speed signals, an acceleration signal a is formed in Step 5 by means of differentiating (shown as a negative acceleration –b). In Step 6, a differential speed signal s is formed from individual rotational wheel speed signals, which will be discussed in greater detail in the following.

In Step 7, a test pressure indicator signal x is formed from the acceleration signal a (again shown by the negative acceleration –b) and the differential speed signal s. The test pressure indicator signal x is a linear combination of the acceleration signal a and of the differential speed signal s, which can be described, for example, by the equation $$x = s + c \cdot a$$

wherein c is a constant factor which permits a weighting of the acceleration signal (a) relative to the differential speed signal (s).

In Step 8, it is examined whether a first test pressure indicator signal x1 had been determined. When no test pressure indicator signal x1 had yet been determined, the just determined test pressure indicator signal x is stored as signal x1 in Step 9. Subsequently, a test pressure is generated in Step 10, which acts upon the brake to be examined or the group of brakes to be examined.

After generating the test pressure, Steps 2 to 8 are carried out again; that is, the brake pressure is determined and stored, and a new test pressure indicator signal x is generated.

During the examination in Step 8, if it is now determined that a first test pressure indicator signal x1 is already present, then the test pressure indicator signal x formed after generating the test pressure is therefore stored in Step 11 as the test pressure indicator signal x2.

Subsequently, it is examined in Step 12 whether the two test pressure indicator signals x1, x2 correspond to one another within a tolerance band. If the test pressure indicator signals x1 and x2 coincide, it is assumed that the generated test pressure is too low and the brakes to be examined have not yet responded.

When increasing the test pressure, it is important that the time period between the signals x1 and x2 be not too long, because influence quantities, such as the slope inclination, the air resistance, etc., which influence the acceleration signal, may change in the interim.

In this case, in Step 12, the previously used test pressure is discharged and, after a certain waiting period, a new test pressure is emitted, which is increased by a defined step. Then, Steps 2 to 8 are implemented again. The newly obtained test pressure indicator signal x2 will then be stored in Step 11.

If it is determined in Step 12 that the two test pressure indicator signals x1 and x2 differ by more than the value of the tolerance band, the brake pressure p stored after the increase of the test pressure in Step 3 is emitted in Step 12 as a response pressure p=p (responding).

In the following, by means of two examples, the determination of the acceleration signal a and of the differential speed signal s carried out in Steps 5 and 6 will be discussed.

EXAMPLE 1

The basis is a vehicle with a rear axle drive, for which the response pressure is to be determined at the brakes of the front axle (4×2 vehicle with 4 wheels, of which 2 are powered). The acceleration signal can be determined, for example, by differentiating the rotational wheel speed signals of the front wheels, that is, of the non-powered wheels:

$$a = \frac{d v_{front\ axle}}{d t}$$

The differential speed signal may be defined, for example, as a dimensionless quantity which is a function of wheel speeds at the non-powered front axle and at the powered rear axle:

$$s = \frac{V_{front\ axle} - V_{rear\ axle}}{V_{rear\ axle}}$$

When the test pressure is controlled into the front wheel brakes, the amount of the acceleration signal a increases and the differential speed signal s is reduced. From the two signals, the test pressure indicator signal x=a+c·s is subsequently formed, wherein c is a factor for the dimensional adaptation of a and s.

EXAMPLE 2

As another example, the determination of the response pressure of the brakes of a trailer vehicle is considered. For this purpose, a test pressure is controlled into the trailer brakes to be examined, while the other brakes are not acted upon by pressure. Also in this case, the acceleration signal a and the differential speed signal s can be derived from rotational speed signals of the towing vehicle. The acceleration signal a can be determined as indicated above.

As an alternative to the above, the differential speed signal may be defined by the following signals measured at the towing vehicle:

$$s = \frac{V_{front\ axle} - V_{rear\ axle}}{V_{front\ axle}}$$

In this case, a test pressure is fed to the braking system of the trailer by way of the pneumatic coupling head, which test pressure results in a reduction of the acceleration signal a without interfering with the differential signal s. A possibly occurring change of the traction force leads to an inverse change of the differential speed signal s and of the acceleration signal a. As a result of a suitable selection of factor c, it can be prevented that these countereffects appear in the test pressure indicator signal x.

If the trailer vehicle is equipped with rotational wheel speed sensors, as an alternative to the above examples a) and b), rotational wheel speed signals of the trailer may be analyzed.

The method of determining the brake response pressure may be supplemented by a control of the engine torque of the towing vehicle. For avoiding a "deceleration jerking" when the test brake pressure is applied, it may be provided—similar to a cruise control—that an engine timing increases the engine torque such that the vehicle deceleration does not change or the change is not noticeable by the driver. The test brake pressure can be built up according to a defined time function, for example, a ramp function. Since the vehicle deceleration a as well as the differential speed signal –s are included in the test pressure indicator signal x, at a constantly held (for example, at a zero) vehicle deceleration a, the response of the brake can also be recognized by the change of the differential speed signal s.

The test brake pressure required for determining the response pressure of the brakes can be built up according to a defined time function. The test pressure buildup will then not be perceived to be disturbing by the driver, and a precision control of the vehicle deceleration is simultaneously permitted. When the test pressure exceeds a defined pressure level, it may be provided that the engine torque is increased in order to prevent a further deceleration of the vehicle. The change of the test pressure indicator signal x will then only still depend on the change of the differential speed signal s.

Figure 2:
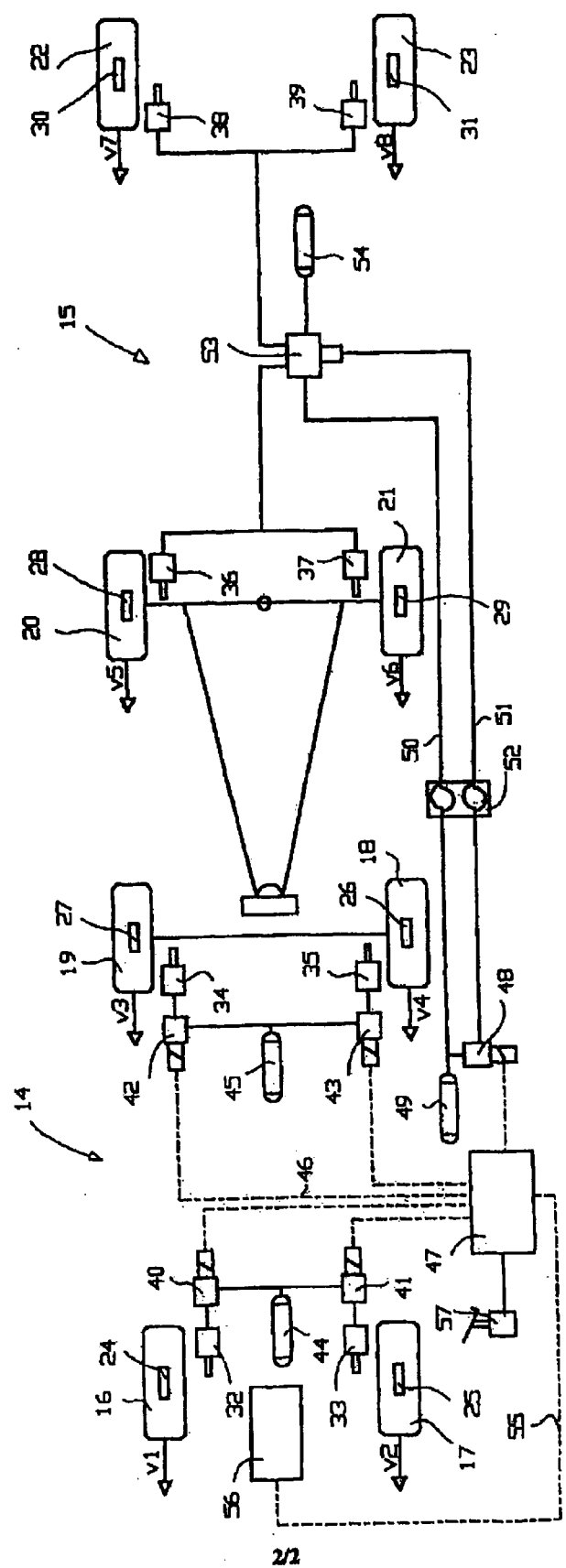
FIG. 2 is a view of a braking system for applying the method according to the invention.

FIG. 2 is a schematic representation of the braking system of a towing vehicle 14 and of a trailer vehicle 15. The towing vehicle 14 has front wheels 16, 17 and rear wheels 18, 19. The trailer vehicle 15 also has front wheels 20, 21 and rear wheels 22, 23. A wheel speed sensor 24–31 as well as a brake cylinder 32–39 is assigned to each o the wheels 16–23. One ABS valve 40–43, respectively, is connected in front of the brake cylinders 32–35 of the towing vehicle 14. The brake cylinders 32, 33 of the front axle are supplied with compressed air by a first storage pressure reservoir 44, and the brake cylinders 34, 35 of the rear axle are supplied with compressed air by a second storage pressure reservoir 45. The ABS valves 40–43 are connected with a central control unit 47 by way of electric lines. The rotational wheel speed sensors 24–31 of the towing vehicle 14 and of the trailer vehicle 15 are connected with the control unit 47 also by way of electric lines (not shown).

For controlling the braking system of the trailer vehicle, a trailer control valve 48 controlled by the control unit 47 is provided in the towing vehicle 14, which trailer control valve 48 is supplied with storage pressure by a storage pressure reservoir 49. From the storage pressure reservoir 49 and from the trailer control valve 48, pneumatic pipes 50, 51 lead, by way of a pneumatic coupling 52, to a trailer brake valve 53 provided on the trailer vehicle. The trailer brake valve 53 is supplied with pressure medium by a storage pressure reservoir 54 and acts upon the brake cylinders 36, 37 of the front axle or the brake cylinders 38, 39 of the rear axle of the trailer vehicle 15. By way of an electric line 55, the control unit 47 is also connected with an electronic engine timing system 56. Finally, a foot brake valve 57 is provided by which the driver supplies a braking request signal to the control unit 47.

If the response pressure of the brake cylinders 32, 33 of the front axle of the towing vehicle 14 is to be determined, before and after generating the brake pressure, the acceleration signal a and the differential speed signal s, respectively, are determined by means of the following equations:

$$s = \frac{v1 - v3}{v3}$$

$$a = \frac{dv1}{dt}$$

wherein s and a are determined before and after generating the test pressure signal, and the corresponding test pressure indicator signals x1, x2 are formed and compared with one another. Corresponding to the method described in FIG. 1, the control unit 47 determines the response pressure of the brake cylinders 32, 33.

The response pressure of the other brake cylinders 34–39 can be determined in an analogous manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Table of Reference Numbers

1–13 process steps
14 towing vehicle
15 trailer vehicle
16,17 front wheels
18,19 rear wheels
20,21 front wheels 22,23 rear wheels
24–31 rotational wheel speed sensors
32–39 brake cylinders
40–43 ABS valve
44,45 storage pressure reservoir
46 electric line
47 control unit
48 trailer control valve
49 storage pressure reservoir
50,51 pneumatic pipe
52 pneumatic coupling
53 trailer brake valve
54 storage pressure reservoir
55 electric line
56 engine timing system
57 foot brake valve

What is claimed is:

1. A method for determining a response pressure of brakes of a vehicle, the method comprising the acts of:
    a) admitting a test pressure to the brakes to be examined;
    b) measuring rotational wheel speed signals at at least two axles of the vehicle;
    c) from the measured rotational wheel speed signals, determining an acceleration signal;
    d) after applying the test pressure to the brakes to be examined, determining a brake pressure at the brakes to be examined;
    e) in each case, for a driving condition with and without applying the test pressure, forming a differential speed signal(s) as a function of a difference between rotational wheel speed signals of a powered and of a non-powered axle;
    f) forming test pressure indicator signals, respectively, each as a function of the acceleration signal and the differential speed signal; and
    g) comparing two test pressure indicator signals formed, and repeating steps (a)–(f) with an increased test pressure when the two test pressure indicator signals coincide, and emitting the applied test pressure when the two test pressure indicator signals do not coincide.

2. The method according to claim 1, wherein the acceleration signal is formed from rotational wheel speed signals of a non-powered vehicle axle.

3. A method according to claim 1, wherein the differential speed signal is a function of a ratio of the difference between at least two wheel rotation speeds and one of said two wheel rotation speeds.

4. A method according to claim 2, wherein the differential speed signal is a function of a ratio of the difference between at least two wheel rotation speeds and one of said two wheel rotation speeds.

5. The method according to claim 1, wherein the acceleration signal is formed by a time derivation of the rotational wheel speed signals of a brake of a wheel to be examined.

6. The method according to claim 3, wherein the acceleration signal is formed by a time derivation of the rotational wheel speed signals of a brake of a wheel to be examined.

7. The method according to claim 1, wherein the one test pressure indicator signal is the linear combination $x=s+c\cdot a$, wherein s is the differential speed signal, a is the acceleration signal and c is a constant factor.

8. The method according to claim 2, wherein the one test pressure indicator signal is the linear combination $x=s+c\cdot a$, wherein s is the differential speed signal, a is the acceleration signal and c is a constant factor.

9. The method according to claim 3, wherein the one test pressure indicator signal is the linear combination $x=s+c\cdot a$, wherein s is the differential speed signal, a is the acceleration signal and c is a constant factor.

10. The method according to claim 5, wherein the one test pressure indicator signal is the linear combination $x=s+c\cdot a$, wherein s is the differential speed signal, a is the acceleration signal and c is a constant factor.

11. A method according to claim 1, wherein for determining the response pressure of brakes of a trailer vehicle attached to a towing vehicle, only rotational wheel speed signals of the towing vehicle are utilized.

12. A method according to claim 2, wherein for determining the response pressure of brakes of a trailer vehicle attached to a towing vehicle, only rotational wheel speed signals of the towing vehicle are utilized.

13. A method according to claim 3, wherein for determining the response pressure of brakes of a trailer vehicle attached to a towing vehicle, only rotational wheel speed signals of the towing vehicle are utilized.

14. A method according to claim 5, wherein for determining the response pressure of brakes of a trailer vehicle attached to a towing vehicle, only rotational wheel speed signals of the towing vehicle are utilized.

15. The method according to claim 1, wherein when the test pressure is admitted, an engine torque is increased.

16. A method for determining a response pressure of at least one brake of a vehicle to be examined, the method comprising the acts of:
    generating a test pressure indicating signal both before and after a test pressure is admitted to the brake to be examined, wherein the test pressure indicating signal is a linear combination of an acceleration signal and a differential speed signal; and
    if the test pressure indicator signals correspond to one another within a tolerance band, an increased test pressure is admitted and a new test pressure indicator signal is generated; and
    if the test pressure indicator signals do not correspond, then an existing brake pressure is considered to be the response pressure if the difference between the two test pressure indicator signals exceeds a defined limit value.

* * * * *